United States Patent
Kanatsu

(10) Patent No.: US 10,455,163 B2
(45) Date of Patent: Oct. 22, 2019

(54) IMAGE PROCESSING APPARATUS THAT GENERATES A COMBINED IMAGE, CONTROL METHOD, AND STORAGE MEDIUM

(71) Applicant: CANON KABUSHIKI KAISHA, Tokyo (JP)

(72) Inventor: Tomotoshi Kanatsu, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/837,436

(22) Filed: Dec. 11, 2017

(65) Prior Publication Data
US 2018/0184012 A1 Jun. 28, 2018

(30) Foreign Application Priority Data
Dec. 26, 2016 (JP) .................... 2016-251300

(51) Int. Cl.
| | |
|---|---|
| H04N 5/265 | (2006.01) |
| G06T 5/00 | (2006.01) |
| G06K 9/18 | (2006.01) |
| G06K 9/62 | (2006.01) |
| H04N 5/232 | (2006.01) |
| G06K 9/46 | (2006.01) |
| G06K 9/00 | (2006.01) |
| G06K 9/20 | (2006.01) |

(52) U.S. Cl.
CPC ......... *H04N 5/265* (2013.01); *G06K 9/00442* (2013.01); *G06K 9/18* (2013.01); *G06K 9/20* (2013.01); *G06K 9/46* (2013.01); *G06K 9/4604* (2013.01); *G06K 9/6267* (2013.01); *G06T 5/003* (2013.01); *H04N 5/23293* (2013.01); *H04N 5/232123* (2018.08); *H04N 5/232133* (2018.08); *G06K 2209/01* (2013.01)

(58) Field of Classification Search
CPC .... H04N 5/265; H04N 5/23293; G06T 5/003; G06K 9/18; G06K 9/6267; G06K 9/4604
USPC ....................................................... 348/239
See application file for complete search history.

(56) References Cited

U.S. PATENT DOCUMENTS

2002/0075389 A1* 6/2002 Seeger .................... H04N 5/232
348/222.1

FOREIGN PATENT DOCUMENTS

JP 2015-197896 * 9/2015
JP 2015197896 A 11/2015

* cited by examiner

*Primary Examiner* — Lin Ye
*Assistant Examiner* — Chan T Nguyen
(74) *Attorney, Agent, or Firm* — Rossi, Kimms & McDowell LLP

(57) ABSTRACT

An image processing apparatus includes a camera for image capture; a first extracting unit for extracting one or more specified areas from an image obtained by preliminary image capture of the document; an estimating unit for estimating relative focal length in each of the specified areas based on blur amount of each of them; a classifying unit for classifying each of the specified areas by level based on relative focal length; a determining unit for determining focus position in each level based on position of the specified area belonging to each level; and an obtaining unit for obtaining the plurality of images by performing primary image capture of the document at the determined focus position in each level, wherein relative focal length represents a change amount of focal length required to change from in-focus state in one specified area to in-focus state in another specified area.

15 Claims, 8 Drawing Sheets

IMAGE PROCESSING APPARATUS THAT GENERATES A COMBINED IMAGE, CONTROL METHOD, AND STORAGE MEDIUM

BACKGROUND OF THE INVENTION

Field of the Invention

The present invention relates to image processing to generate, from images obtained by capturing images of a document from an oblique direction, a directly-facing image in which focus is achieved in the entire document.

Description of the Related Art

Recently, in obtaining information such as characters included in a document such as business forms, images have often been captured by using a camera function included in a portable device such as a smartphone or a tablet (hereinafter referred to as a "smart device"), instead of capturing information by using, for example, a dedicated scanner. On this occasion, it is often difficult to capture an image of a target document in a directly-facing position because of an obstacle or the shadow of lighting, and the image must be captured obliquely. In terms of avoiding camera shake, it is preferable to fix the smart device, rather than to hand-hold it, to capture an image. However, fixing the smart device to directly face a document placed on a desk requires large-scale dedicated equipment, and therefore a stand or the like for holding the smart device in an oblique position is convenient to use as a simple fixing method. Such a method for fixing the smart device has limitations. This is also one of the reasons why the image of the target document needs to be captured from an oblique direction.

Capturing an image of a document from an oblique direction as described has a problem that a difference between distances from a camera in near and far portions relative to the camera exceeds a depth of field of a lens and an image in which focus is achieved in the entire document cannot be obtained by the capturing at a single time. Particularly in a case where it is intended to read character information from a captured image, the above problem occurs more often because close-up is needed to increase an image resolution in a character area which is to be subjected to character recognition processing (OCR processing).

In this regard, Japanese Patent Laid-Open No. 2015-197896, for example, discloses a method for obtaining an image in which focus is achieved in the entire target document by collecting areas of a high focusing degree, from a plurality of images captured with change in focus position, and generating one image.

As described above, to capture images of a document from an oblique direction and obtain a combined image in which focus is achieved in the entire document, it is needed to perform the image capturing multiple times with change in focus position. In a case where OCR processing is to be performed on the obtained combined image, attempting to ensure a certain rate of character recognition or higher may result in excessive times of image capturing. Performing image capturing many times in a short period of time has few problems, but in the case of image capturing with the camera included in the smart device, a time for lens control is required every time a focus position is changed, and a prolonged time period may be required by the completion of image capturing. Many of such included cameras do not have a distance-measuring sensor for auto-focus, which is because a proper focal length is detected based on signal change in an imaging device when a lens is actually moved. Meanwhile, in a case where the number of times the image capturing is performed (the number of times a focus position is changed) is insufficient, focus may not be achieved in some portions within the combined image, failing to have an image quality suitable for use in the OCR processing or the like in the subsequent process.

SUMMARY OF THE INVENTION

An image processing apparatus according to the present invention is an image processing apparatus for generating a combined image in which focus is achieved in a whole of a document from a plurality of images having different focus positions, the image processing apparatus including: a camera for image capturing; a first extracting unit configured to extract one or more specified areas from an image obtained by preliminary image capturing of the document; an estimating unit configured to estimate a relative focal length in each of the specified areas based on a blur amount of each of the specified areas; a classifying unit configured to classify each of the specified areas by level based on the relative focal length; a determining unit configured to determine a focus position in each level based on a position of the specified area belonging to each level; and an obtaining unit configured to obtain the plurality of images by performing primary image capturing of the document at the determined focus position in each level, wherein the relative focal length represents a change amount of focal length required for changing from an in-focus state in one specified area to an in-focus state in another specified area.

Further features of the present invention will become apparent from the following description of exemplary embodiments with reference to the attached drawings.

DESCRIPTION OF THE EMBODIMENTS

Hereinafter, with reference to the attached drawings, the present invention is explained in detail in accordance with preferred embodiments. Configurations shown in the following embodiments are merely exemplary and the present invention is not limited to the configurations shown schematically.

First Embodiment

Figure 1:
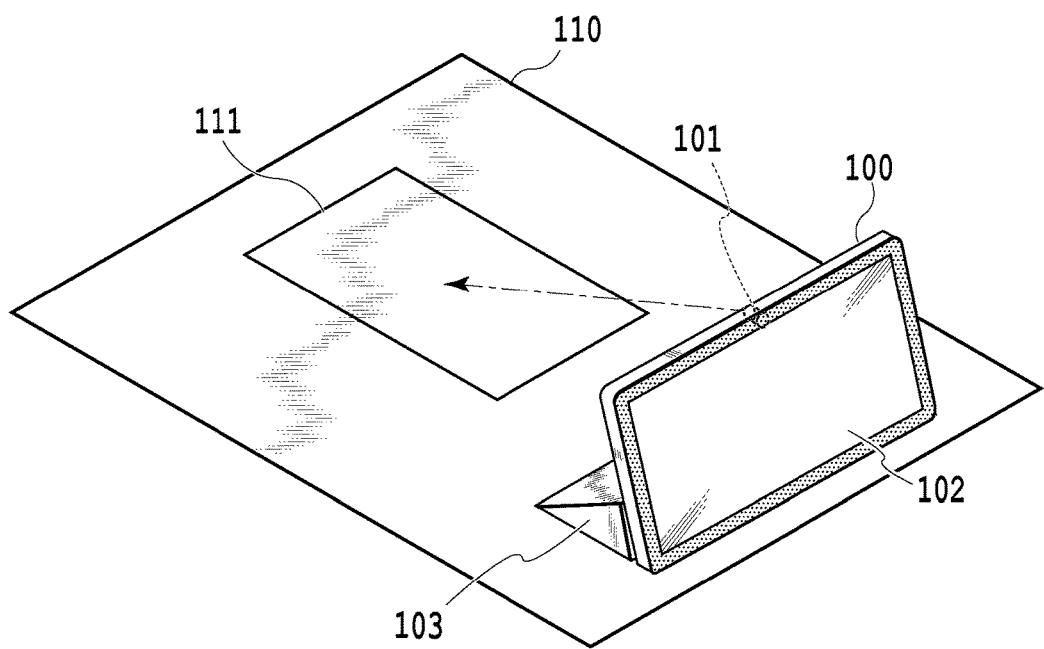
FIG. 1 is a view showing a situation in which an image of a document is captured by using a smart device.

FIG. 1 is a view showing a situation in which an image of a document is captured by using a smart device. In this example, a tablet terminal 100 having a camera 101 and a display 102 is used as the smart device, but any portable device having a camera function may be used, such as a smartphone or a notebook PC. Now, a document 111 to be captured is placed on a horizontal surface 110 such as a desk. The tablet terminal 100 is fixed obliquely by a stand 103 such that the document 111 fits in an angle of view of the camera 101. At this time, an angle at which the stand 103 supports the tablet terminal 100 may be adjustable depending on the position or size of the document 111.

Figure 2:
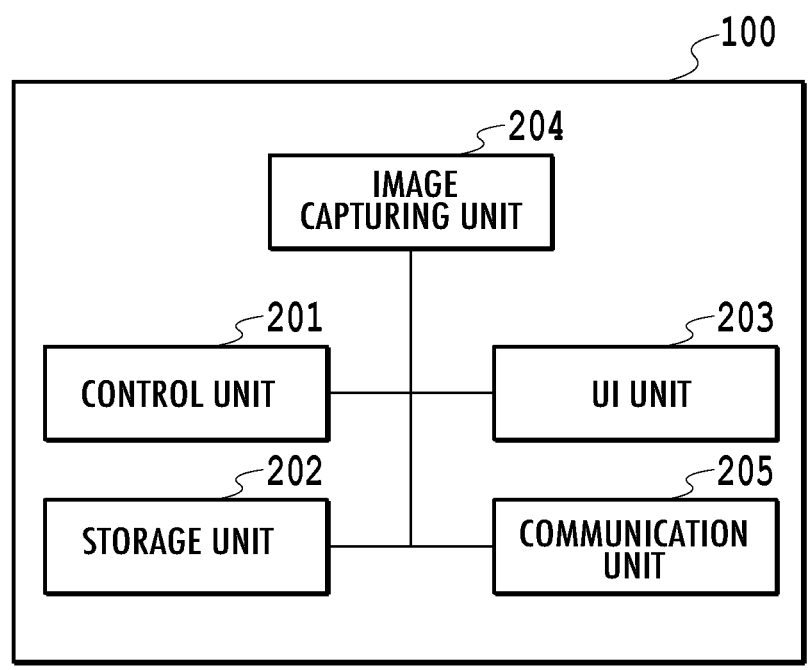
FIG. 2 is a functional block diagram showing an internal configuration of a tablet terminal.

FIG. 2 is a functional block diagram showing an internal configuration of the tablet terminal 100. The tablet terminal 100 is made up of a control unit 201, a storage unit 202, a UI unit 203, an image capturing unit 204, and a communication unit 205. The control unit 201 is a CPU or a GPU, for example, and executes various programs including image processing, stored in the storage unit 202 such as RAM or ROM. Results of the execution of the programs are displayed on the display 102 forming the UI unit 203. Further, the display 102 has a touch panel function, and a user instruction as inputted is sent to the control unit 201 via the UI unit 203. The image capturing unit 204 captures an image by controlling the camera 101 upon receipt of an instruction from the control unit 201. Image data obtained by the capturing of the image is sent to the storage unit 202 and stored. The communication unit 205 transmits the captured image data or the like to an external device via a wireless LAN or the like to, for example, a PC (not shown) which performs OCR processing. Needless to say, the tablet terminal 100 itself may further include an image processing unit which performs the OCR processing.

Figure 3:
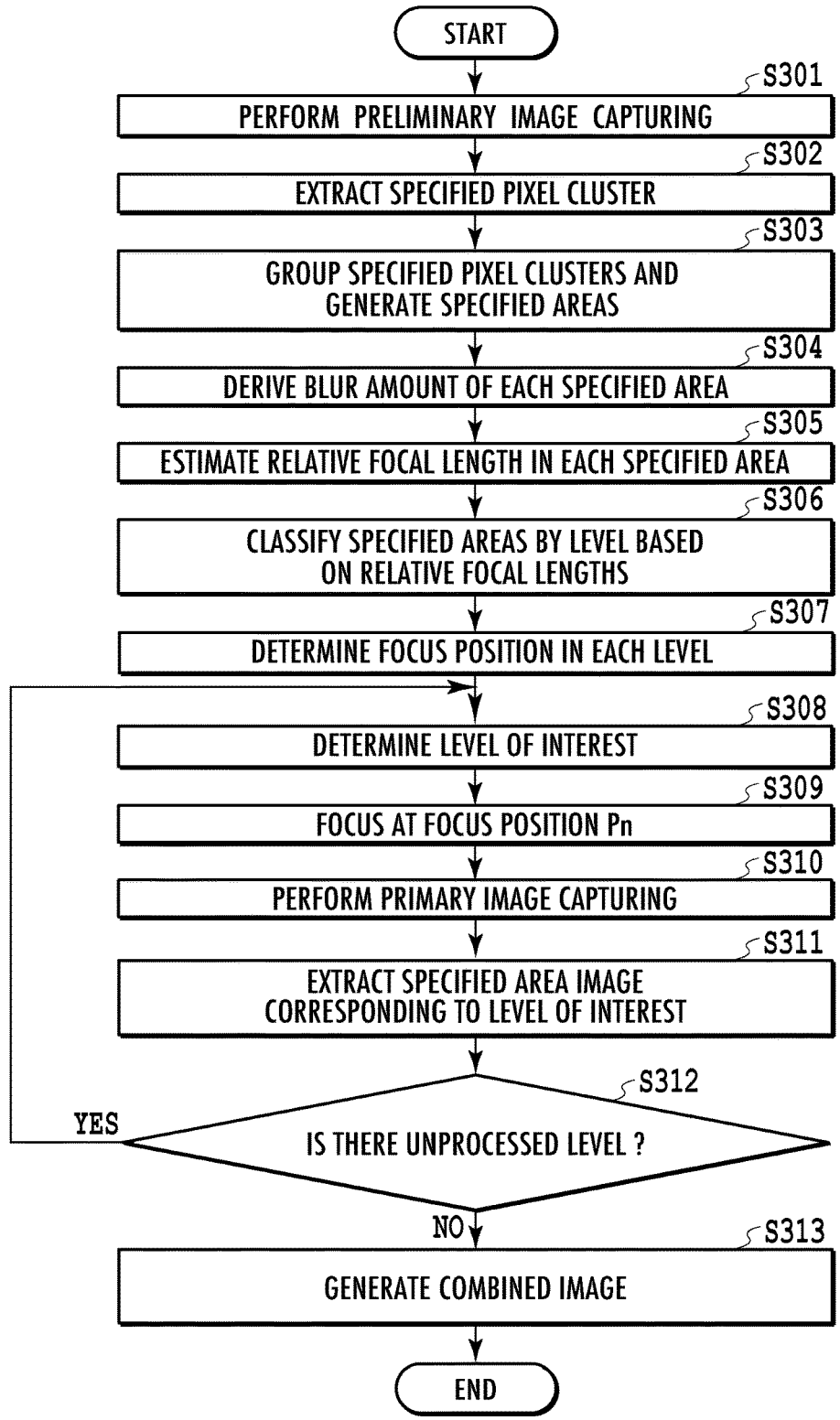
FIG. 3 is a flow chart showing the flow of image capturing control.

Next, a description will be given of control to capture images of a document such as a business form from an oblique direction by using the tablet terminal 100 to obtain a directly-facing image (combined image) in which focus is achieved in the entire document. FIG. 3 is a flow chart showing the flow of image capturing control. A series of processes as described below is achieved by the CPU in the control unit 201 executing predetermined programs stored in the storage unit 202.

In step 301, as for the document 111 to be captured, preliminary capturing of an image (preliminary image capturing) is performed for determining in which focus positions and how many times capturing of images that will actually be used in combining processing is performed (primary image capturing). Prior to the preliminary image capturing, the position of the tablet terminal 100 and the angle of the stand 103 are adjusted beforehand so that the entire document 111 fits in the angle of view of the camera 101 and also the margin other than the document 111 is minimized. Furthermore, a real time preview image obtained by the camera 101 may be displayed on the display 102 so that a user can easily make the adjustment. For the preliminarily captured image in this example, one still image having a focus position in the center of the angle of view is obtained. The obtained preliminarily captured image is stored in the storage unit 202.

In step 302, the preliminarily captured image obtained in step 301 is subjected to the processing of extracting a pixel cluster (a pixel block) having a specific property and attribute. For instance, in a case where OCR processing is planned to be performed on a finally obtained combined image, a set of pixels forming characters in the document 111 is extracted as a specified pixel cluster (i.e. a character pixel cluster). To extract a character pixel cluster from the preliminarily captured image, for instance, a binarization method is used to divide the pixels in the preliminarily captured image into pixels corresponding to a character color and the other pixels. It is desirable to use, for example, the Sauvola method among others for locally and adaptively determining a threshold, on the assumption that the contrast of the preliminarily captured image is not uniform. Then, a connected pixel group (i.e. a connected component) obtained by connecting neighboring pixels (surrounding eight pixels or four pixels on the top, bottom, right, and left) of the pixel that has been determined to correspond to the character color in the binarization is filtered with a probable character size and aspect ratio, whereby a character pixel cluster can be obtained. In this filtering process, a machine learning method may be used. It should be noted that the binarization method is one of the examples, and a method such as MSER may be used to obtain a character pixel cluster by connecting pixels having a similar color or brightness. Furthermore, a document area in the preliminarily captured image may be specified in extracting a character pixel cluster, and the character pixel cluster may be extracted from the specified area as a target. In specifying the document area, boundaries forming the four sides of the document 111 may be estimated by a known edge detection method. Furthermore, to simplify the processing in the present step and the following step 303, image correction may be performed to convert a trapezoid formed by the four sides estimated by edge detection into a rectangle, and the corrected image may be subjected to the processing in the present step.

In step 303, among the specified pixel clusters extracted in step 302, those within a certain distance are grouped (i.e. a specified grouped area is generated). In a case where the specified pixel blocks are character pixel clusters, one or more character areas made up of a plurality of character pixel clusters are generated in the present step. In the grouping in this case, a threshold of a distance between character pixel clusters for determining whether the character pixel clusters are within a certain distance may be relatively determined depending on the size of the character pixel block, for example. Alternatively, a histogram of distances between pixel clusters including the nearest character pixel cluster among all of the extracted character pixel clusters may be created to estimate a threshold from the histogram. Meanwhile, in a case where an orientation of characters is known beforehand from a format such as a business form to be captured, a histogram of distances between pixel clusters in a horizontal direction may be used for a horizontal line orientation, and a histogram of distances between pixel clusters in a vertical direction may be used for a vertical line orientation.

In step 304, a blur amount is derived for each of the specified areas generated in step 303. In a case where the specified area is a character area, a blur amount is derived specifically as follows. First, an edge pixel of the character pixel cluster belonging to the character area to be processed is specified. The outer edge pixel is a pixel located on the boundary of a background in a line forming the character. Next, in a multivalued preliminarily captured image before binarization is performed, a pixel gradient in the specified outer edge pixel is obtained, and a representative value S is determined from an average or the like of the pixel gradients. The representative value S corresponds to a sharpness in the boundary portion of the line forming the character. The representative value S is high in an in-focus state and becomes lower depending on the level of blurring in image capturing. Accordingly, a blur amount is obtained for each character area by using, for example, "α/S" based on a reciprocal of the representative value S or "1−βS" obtained by subtraction of S from a constant, where both α and β are experimentally obtainable constants.

In step 305, based on the blur amount of each specified area derived in step 304, a relative focal length for each specified area is estimated. As used herein, the relative focal length represents a change amount of focal length required for changing from an in-focus state in one specified area to an in-focus state in another specified area. For this estimation, an approximate expression or a conversion table (LUT) representing the relation between the blur amount and the relative focal length may be used. Parameters in the approximate expression and values in the conversion table are supposed to be measured and obtained in advance, which are inherent to the camera 101 in the tablet terminal 100.

In step 306, the specified areas are classified into N levels (N≥1) based on the relative focal lengths estimated in step 305. At this time, the classification is performed such that, among the plurality of specified areas belonging to the same level, if any one of the specified areas is brought into focus, blur amounts of the other specified areas do not exceed a predetermined blur amount that is acceptable (hereinafter referred to as an acceptable blur amount).

Regarding the classification of the specified areas (classification by level), a description will be given of an example of the case where the specified areas are the character areas. In this case, a blur amount of which a certain rate of character recognition or higher can be expected in the OCR processing performed after generating a combined image applies to the above-mentioned acceptable blur amount. The OCR processing assumed herein is general OCR processing for extracting and identifying features based on the contour of the line forming the character from a character image. In such OCR processing, the features of the contour deteriorate and accuracy of recognition decreases in an image having an excessive blur amount. However, it is impossible to completely avoid blurring in imaging of the characters printed on paper with a scanner or a camera. In the identification in the OCR processing, therefore, blurring is acceptable to some extent by, for example, learning also an image having blurs. Then, the same character image having a different level of blurring is inputted to the OCR processing; a maximum value Bc of the blur amount of which a rate of character recognition is assumed to be practically sufficient is obtained; and the value Bc is determined to be an acceptable blur amount and stored in the storage unit 202. The acceptable blur amount as prepared in advance is used to arrange the character areas in an ascending order (or a descending order) of the relative focal lengths as estimated. Then, the blur amounts of the adjacent character areas are compared, and if a difference between the blur amounts is equal to or less than the threshold Bc, the character areas are classified into the same level. In this example, in the determination of whether the difference between the blur amounts is equal to or less than the threshold Bc, in a case where one of the character areas has a blur amount close to "0," it may be determined whether the other character area has a blur amount equal to or less than the threshold Bc. In a case where absolute values of both of the blur amounts are large, a blur amount generated in the other character area, if a focus position is changed to one of the character areas to have a relative focal length of "0," is estimated and it may be determined whether the blur amount is equal to or less than the threshold Bc. The blur amount after changing the focus position may be estimated by applying a difference in relative focal lengths between the two character areas to the relation between the blur amount and the relative focal length used in step 305.

In step 307, a focus position Pn is determined for each level Ln (n=1 to N) used in the classification in step 306. For instance, a barycenter of all character areas classified into the level Ln is indicated by Pn. Alternatively, a barycenter of a character area having the largest area in the level may be indicated by a focus position Pn. It should be noted that in a case where trapezoid correction is performed on the preliminarily captured image in step 302, it is needed to invert the coordinates of the focus position Pn as obtained herein into a coordinate system of the preliminarily captured image before the trapezoid correction. Incidentally, the preliminarily captured image becomes unnecessary at this point, but data on the preliminarily captured image will be stored in the storage unit 202 in the case of a third modification example, which will be described later.

In step 308, a level of interest is determined from the levels Ln used in the classification in step 307. In the following step 309, the camera 101 is controlled to focus in a focus position corresponding to the level of interest. Then in step 310, primary image capturing is performed by the camera 101 being in focus in the focus position corresponding to the level of interest. Consequently, a primarily captured image In (n=1 to N) is obtained and stored in the storage unit 202.

In step 311, an image of the specified area (specified area image) classified into the level of interest is extracted from the obtained primarily captured image. The extracted specified area image is indicated by Gn (n=1 to N). It should be noted that in a case where the trapezoid correction is performed on the preliminarily captured image in step 302, the same trapezoid correction is performed on the primarily captured image In, and the specified area image Gn corresponding to the level of interest is extracted in the coordinate system after the correction.

In step 312, it is determined whether the primary image capturing has been performed with respect to all of the levels Ln used in the classification. If there is an unprocessed level, the process goes back to step 308, and the processing is continued. If the primary image capturing has been performed with respect to all levels, the process proceeds to step 313. In step 313, combining processing is performed using the specified area image Gn extracted from each level. Accordingly, one combined image can be obtained in which focus is achieved for each of the levels used in the classification based on the acceptable blur amount and in which focus is achieved in the entire target document. In the combining processing, if there is no overlapping portion between the specified area images, the combined image may be simply generated as the sum of the specified area images Gn. Furthermore, if the result of combining will be used for the OCR processing, the collection of the character area images as the specified area images may be directly used as the combined image. Then, appropriate character area images may be inputted to the OCR processing.

The content of the control to obtain a combined image by capturing images of a document from an oblique direction has been described. Hereinafter, a description will be given of a specific example of the case of obtaining a combined image based on the OCR processing with reference to FIGS. 4A to 7E.

Figure 4A:
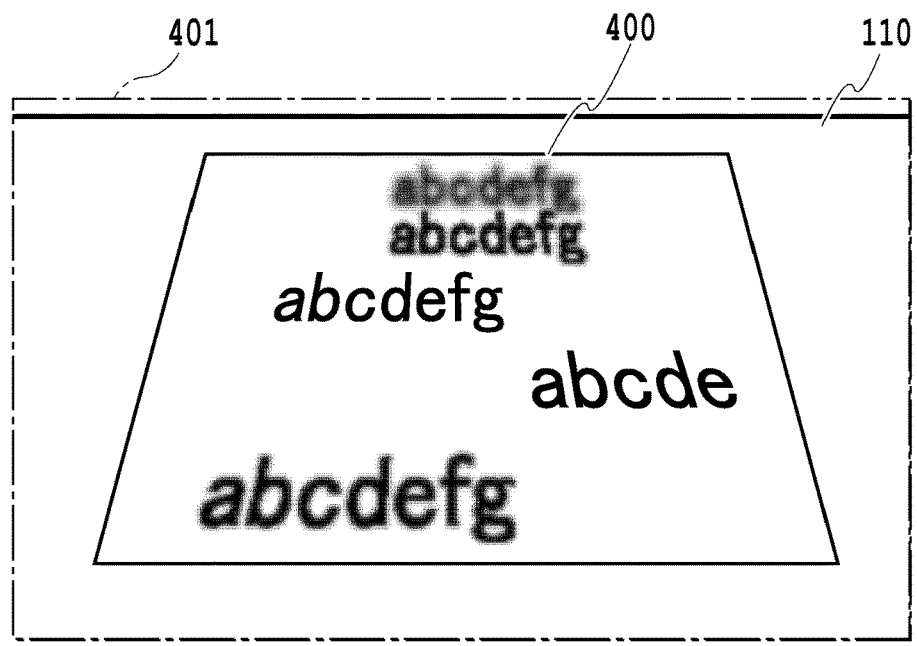
FIG. 4A shows an example of a preliminarily captured image.
Figure 4B:
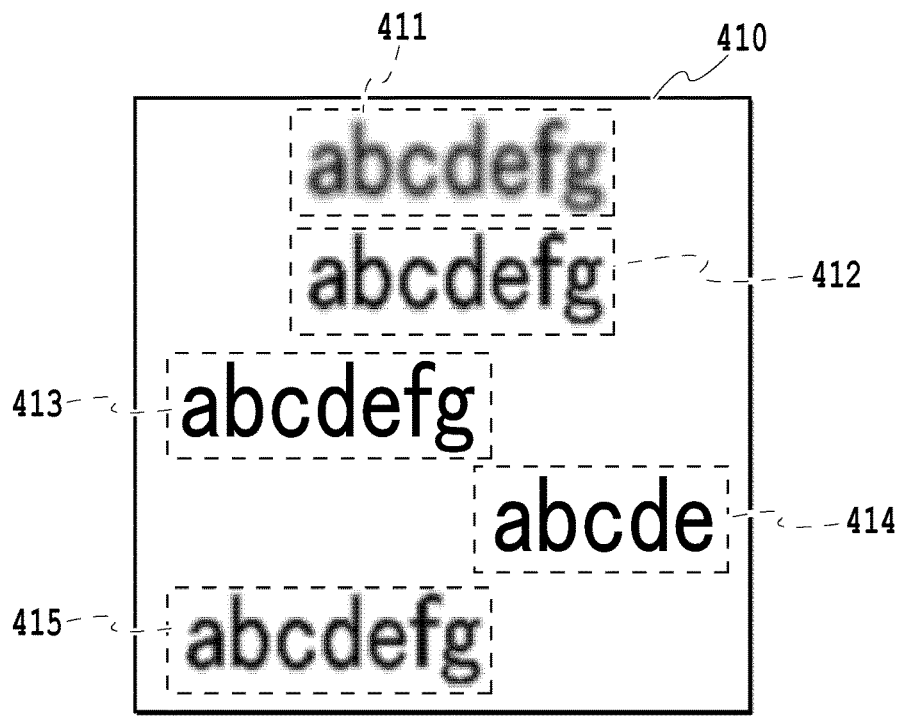
FIG. 4B shows an example of a result of trapezoid correction performed on the preliminarily captured image.
Figure 5:
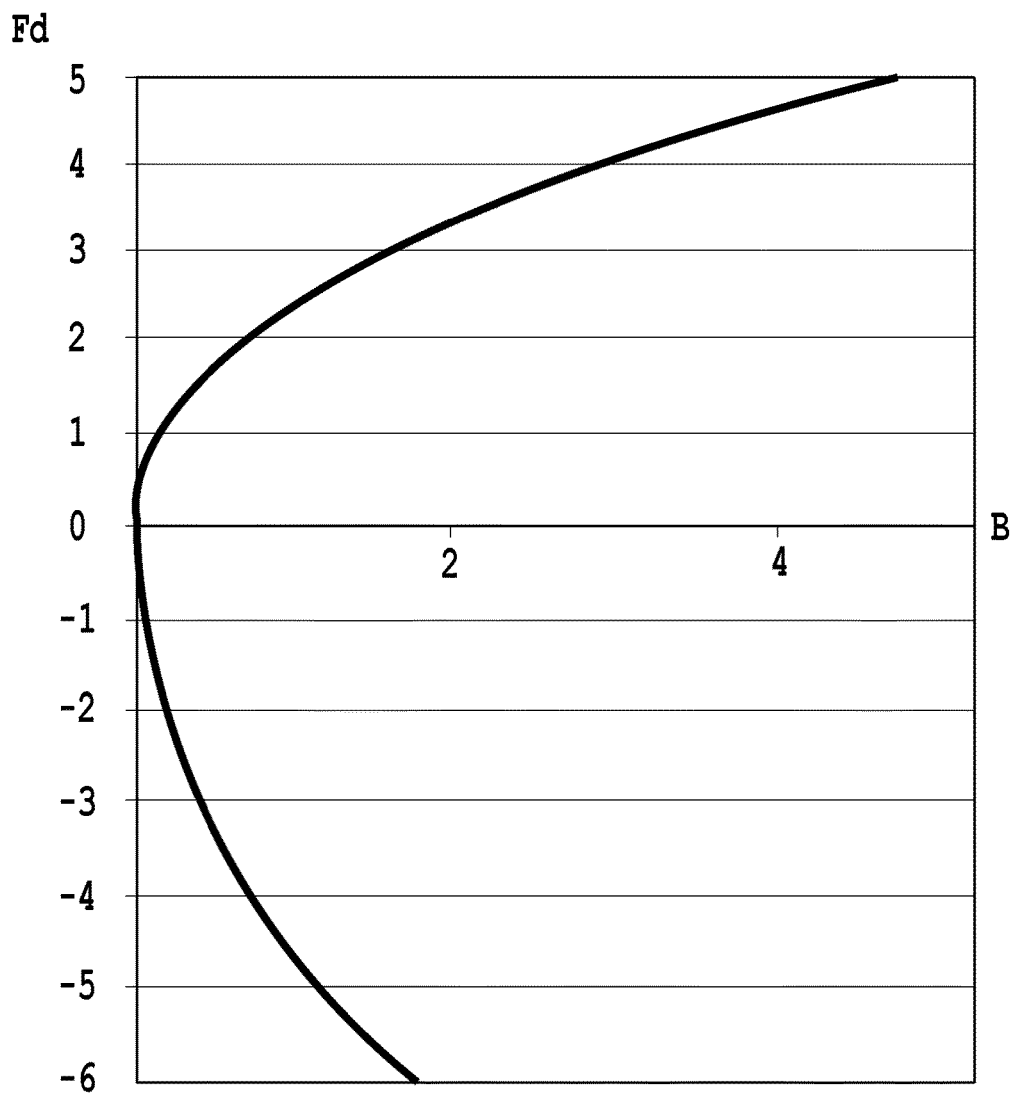
FIG. 5 is a graph showing characteristics of a LUT.

FIG. 4A shows a preliminarily captured image 401 obtained by preliminary image capturing of a target document 400. The target document 400 includes five character strings each consisting of the alphabets "abcdefg" aligned across. Since the target document 400 is captured from the oblique direction, an area corresponding to the target document 400 in the preliminarily captured image 401 is deformed in a trapezoid. FIG. 4B shows a corrected preliminarily captured image 410 obtained by performing trapezoid correction on the preliminarily captured image 401. Rectangles 411 to 415 indicated by dashed lines in the corrected preliminarily captured image 410 show the character areas obtained through the step of extracting the character pixel clusters (step 302) and the step of grouping the character pixel clusters (step 303). Then, blur amount B deriving processing is performed on each of the character areas 411 to 415 (step 304). In this example, blur amounts derived for the character areas 411 to 415 are $B_{411}=3.4$, $B_{412}=1.3$, $B_{413}=0.05$, $B_{414}=0.5$, and $B_{415}=0.9$, respectively. Based on the blur amount as derived, a relative focal length Fd is estimated for each of the character areas (step 305). In this example, relative focal lengths for the character areas 411 to 415 are estimated to be $Fd_{411}=4$, $Fd_{412}=2$, $Fd_{413}=0$, $Fd_{414}=-2$, and $Fd_{415}=-3$, respectively. In this estimation, a LUT is used which is obtained by, for example, plotting the blur amounts B obtained beforehand by actual measurement and the relative focal lengths Fd and performing linear compliment between the actual measurement points. FIG. 5 is a graph showing characteristics in the obtained LUT in which the horizontal axis is the blur amount B and the vertical axis is the relative focal length Fd. Incidentally, since the target document 400 is captured from the oblique direction, not in a directly-facing position, the upper part and the lower part of the preliminarily captured image 401 in the trapezoid can be estimated to be far and near relative to the camera 101, respectively. Furthermore, since the preliminarily captured image 401 is captured with the center of the angle of view being in focus, the relative focal length is estimated by interpreting the positive/negative range of the Fd value in the graph shown in FIG. 5.

Then, the character areas 411 to 415 are classified into one or more levels based on the estimated relative focal lengths (step 306). In this example, it is assumed that a value of an acceptable blur amount Bc determined in advance based on the rate of character recognition required for the OCR processing is 0.6. In this case, classification by level is performed such that whichever character area is brought into focus among the character areas in the same level, blur amounts of the other character areas in the same level do not exceed 0.6. A description will be given in more detail. First, the character areas 411 to 415 are sorted in a descending order of the estimated relative focal lengths. Based on the relative focal lengths $Fd_{411}=4$, $Fd_{412}=2$, $Fd_{413}=0$, $Fd_{414}=-2$, and $Fd_{415}=-3$, the character areas 411, 412, 413, 414, and 415 are sorted in this order. Next, with reference to the character area 413 having a relative focal length of "0," first, a blur amount of the character area 412 $B_{412}=1.3$ is compared with the acceptable blur amount Bc=0.6. Since $B_{412}>Bc$, the character areas 412 and 413 are classified into different levels. Next in the same manner, with reference to the character area 413, a blur amount of the character area 414 $B_{414}=0.5$ is compared with the acceptable blur amount Bc=0.6. In this case, since $B_{414}<Bc$, the character areas 413 and 414 are classified into the same level. Meanwhile, as for the character area 415, the adjacent character area 414 has already been determined to be classified into the same level as the reference character area 413. Thus, determination is made with a blur amount $B_{415}=0.9$ with reference to the character area 413. Since $B_{415}>Bc$, the character area 415 is classified into a level different from the character areas 413 and 414. The remaining character area 411 is determined by changing a focus position to the character area 412. In this example, since a difference in the relative focal lengths between both areas is "4−2=2," by shifting a curve showing the characteristics of FIG. 5 by the difference, it is estimated that a blur amount of the character area 411 is $B_{411}'=1.3$ after the change in the focus position. Accordingly, since $B_{411}'>Bc$, the character area 411 is classified into a level different from the character area 412. As a result, the character areas 411 to 415 shown in FIG. 4B are classified into four levels. The character areas belonging to each one of the level Ln are expressed by $L1 \ni \{411\}$, $L2 \ni \{412\}$, $L3 \ni \{413,414\}$, and $L1 \ni \{415\}$.

Figure 6:
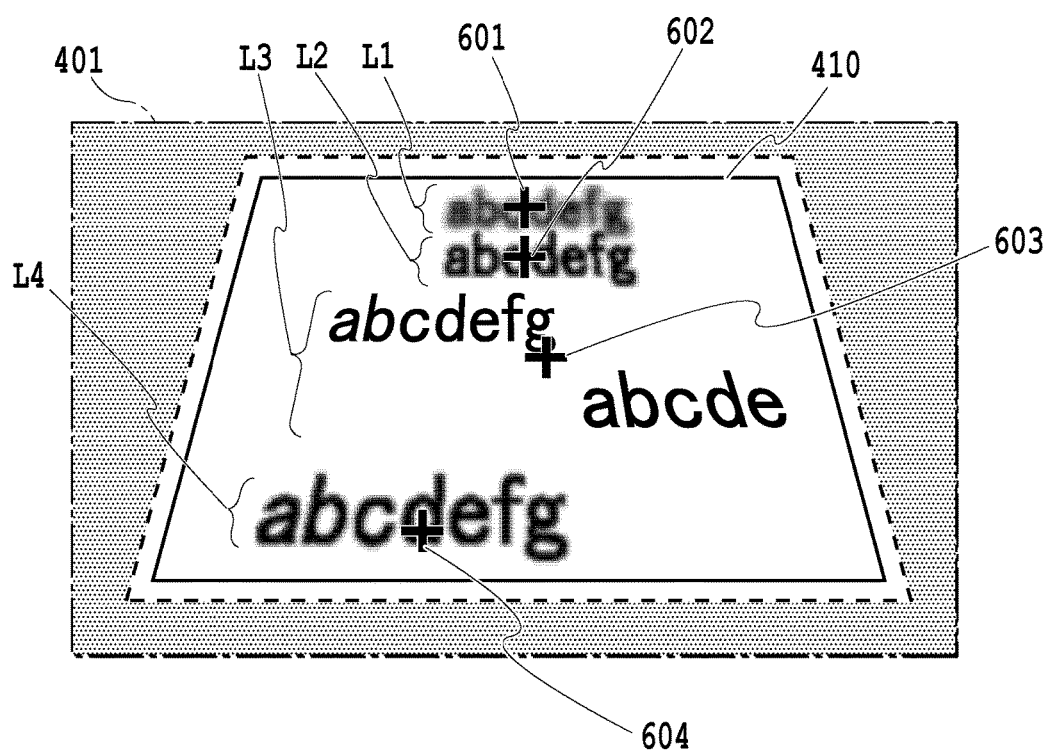
FIG. 6 is a view showing a focus position in each level.
Figure 7A:
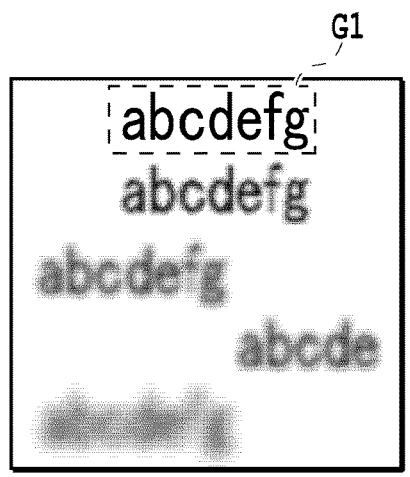
FIGS. 7A to 7D show examples of primarily captured images obtained by primary image capturing.
Figure 7B:
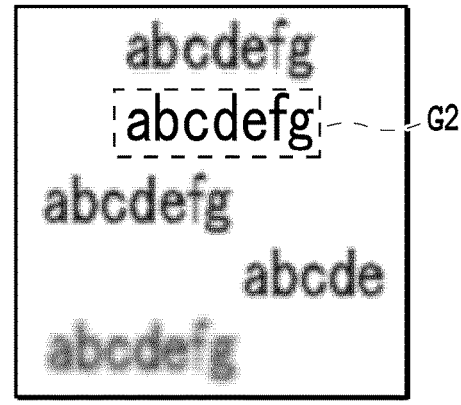
Figure 7C:
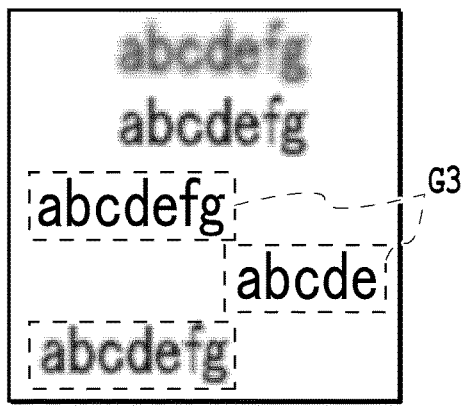
Figure 7D:
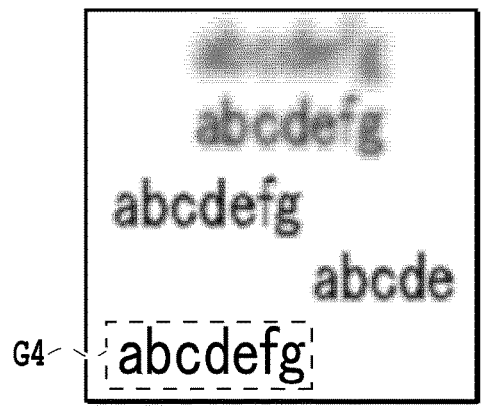
Figure 7E:
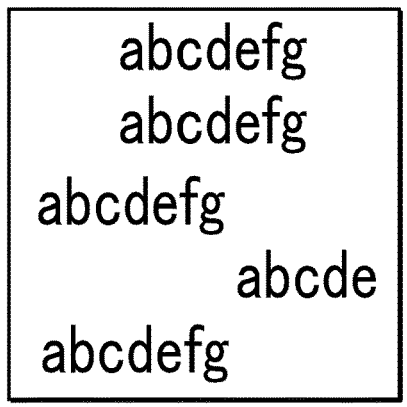
FIG. 7E shows an example of a combined image.

After completing the classification by level, the focus position is determined for each level Ln (step 307). FIG. 6 is a view showing the focus position Pn determined for each level Ln. In FIG. 6, four+marks 601 to 604 shown on the preliminarily captured image 401 indicate focus positions P1 to P4 which respectively correspond to four levels L1 to L4. It should be noted that the focus positions P1, P2, and P4 are barycenter positions of the character areas 411, 412, and 415 belonging to their respective levels, and the focus position P3 is a position averaging the barycenter positions of the two character areas 413 and 414 belonging to L3. Once the focus position in each level is determined, primary image capturing is performed in turn at each focus position, and a character area image in each level is extracted (step 308 to step 312). FIGS. 7A to 7D show primarily captured images obtained by performing primary image capturing four times according to the levels L1 to L4. FIGS. 7A, 7B, 7C, and 7D correspond to the levels L1, L2, L3, and L4, respectively. From the primarily captured images shown in FIGS. 7A, 7B, 7C, and 7D, character area images G1, G2, G3, and G4 are extracted, respectively. Finally, the character area image Gn (n=1, 2, 3, 4 in this example) belonging to each level is subjected to combining processing to generate a combined image. FIG. 7E shows a combined image obtained by combining all of the character area images G1 to G4. Consequently, the combined image in which focus is achieved in all of the five character strings in the target document 400 can be obtained.

As described above, in the image capturing control according to the present embodiment, preliminary image capturing is performed to determine in which focus positions and how many times image capturing should be performed in a case where focus cannot be achieved in the entire document in an image captured at a single time because the document is captured from the oblique direction. Then, the specified pixel clusters (e.g. character pixel clusters) extracted from the preliminarily captured image are grouped into a specified area (e.g. character string area), and a blur amount and a relative focal length are obtained for each specified area. Then, the specified areas are classified by level based on the relative focal lengths, and the number of times the focus position is changed (the number of times image capturing is performed) in the primary image capturing is determined. Then, the focus position in each level is determined based on the arrangement of the specified areas belonging to each level. Then, the primary image capturing is performed according to the number of times the image capturing is performed and the focus positions as determined, and the plurality of images as obtained are combined to generate a combined image in which focus is achieved in the entire document.

First Modification Example

Figure 8A:
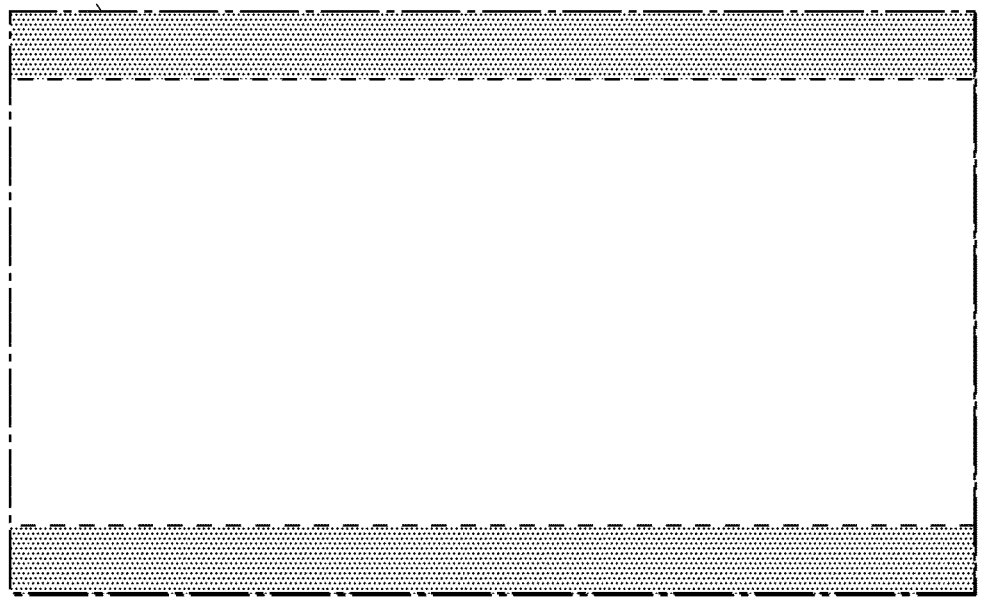
FIGS. 8A and 8B show examples of displaying a guide in the primary image capturing.
Figure 8B:
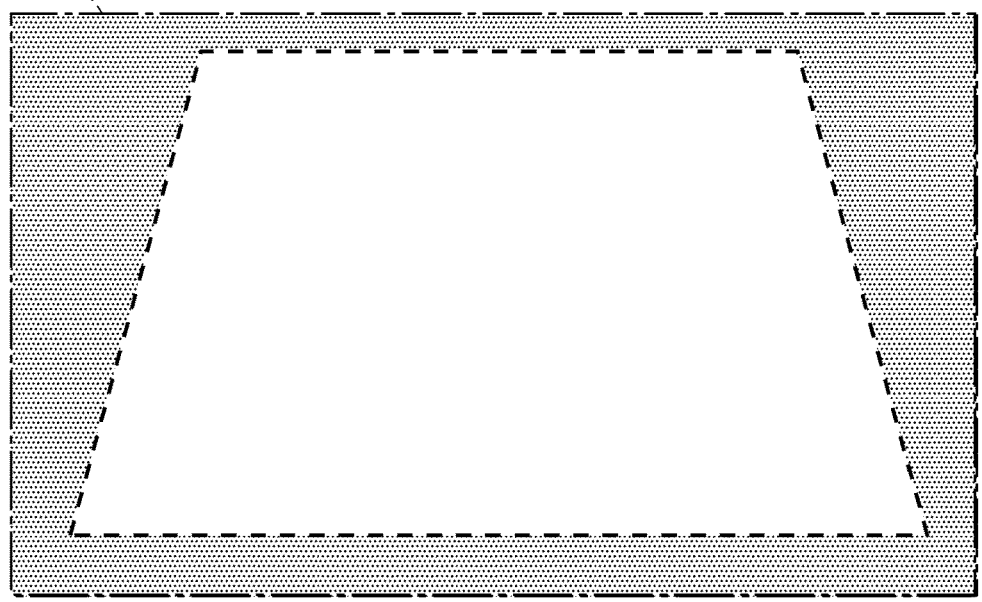

In performing the preliminary image capturing or the primary image capturing, lines showing the top end and the bottom end of the target document within the angle of view may be displayed as a guide on the display 102, for example (see FIG. 8A). Furthermore, in a case where a format (size) of the target document is known in advance, a frame according to the shape of the target document may be displayed (see FIG. 8B). Displaying a guide showing the arrangement of the target document within the angle of view in this manner allows a user to position the target document to be aligned with the displayed lines or frame in placing the tablet terminal 100 and the target document. Moreover, in the above example, one preliminarily captured image is used to determine the number of times the focus position is changed and the focus positions, but a plurality of preliminarily captured images may be used. In obtaining the plurality of preliminarily captured images, displaying a guide is useful. More specifically, two preliminarily captured images, each being in focus at one of a plurality of positions (e.g., the position (x, y0) and the position (x, y1)) based on the lines or frame, are obtained. In this example, x is the center of the angle of view in x coordinate, y0 is a position close to the top end in y coordinate and y1 is a position close to the bottom end in y coordinate. If the camera 101 of the tablet terminal 100 is a multi-lens (multi-sensor) camera capable of stereoscopic imaging, two preliminarily captured images may be obtained at a time. Then, the flow shown in FIG. 3 as described above may be applied by using a first preliminarily captured image which is captured with focus at the position (x, y0) in a part above the center of the target document, and a second preliminarily captured image which is captured with focus at the position (x, y1) in a part below the center of the target document. At that time, the estimation of the relative focal length for each specified area in step 305 is performed by using a LUT or an approximate expression of different characteristics prepared separately for the case of the first preliminarily captured image which is in focus at a far portion and for the case of the second preliminarily captured image which is in focus at a near portion. Needless to say, three or more preliminarily captured images may be used. This can produce an effect of reducing an error from the actual measurement.

Second Modification Example

Examples of the document to be captured include one having specified pixel clusters (e.g. characters) at a high density and one at a low density, as well as one document having mixture thereof. In a case where characters are included at a high density, for example, one character area may have a great difference between blur amounts for the respective characters. Accordingly, the character area may be divided into two or more based on the blur amount by character. Meanwhile, in a case where characters or the like are included at a low density, in classifying the specified areas by level, in consideration of the positional relation between the specified areas on the preliminarily captured image, the specified areas separated by a distance not less than a certain distance may be classified into different levels even within the range of the acceptable blur amount. Alternatively, a threshold for grouping the specified pixel clusters may be changed according to the density of characters or the like or the character size to generate a character area. In this manner, a combined image having a higher image quality may be obtained in consideration of distribution of the characters or the like in the target document.

Third Modification Example

In some cases, a user may perform image capturing in turn by replacing a plurality of business forms in the same format with the tablet terminal 100 being fixed. In such a use case, even after the completion of the processing in step 307, data on the preliminarily captured image may be stored, without being discarded, for the next image capturing of the business form. Then, a preliminarily captured image obtained for new business form image capturing is compared with the previous preliminarily captured image as stored. If it is determined that both formats are the same in terms of the arrangement of the characters, primary image capturing may be performed in the same focus position and for the same number of times as the previous image capturing. For instance, after the processing of grouping the specified pixel clusters (step 303) is completed, the coordinates of the specified area currently obtained are compared with the coordinates of the specified area previously obtained, and if the coordinates are the same, it is determined that the formats are the same. Alternatively, a known image feature extraction technique may be used to determine the correspondence between the images. This can further reduce the time required for image capturing in a case where image capturing processing is continuously performed on the documents such as business forms in the same format.

Fourth Modification Example

In the above examples, the primary image capturing begins immediately after the conditions for the primary image capturing are determined based on the preliminary image capturing. For instance, at a stage when the determination of the focus position in each level (step 307) is completed, information understandably representing what kind of primary image capturing is performed may be displayed on the display 102. Examples of the information to be displayed include an image in which the focus position in each level and the range of the character areas to be subjected to the character image extraction in the same level are superimposed on the preliminarily captured image. Furthermore, the user may add or delete the focus position, for example, after checking the displayed information. This allows the user to adjust the focus positions and the number of times the image capturing is performed for the primary capturing. More specifically, increasing the number of focus positions and the number of times the image capturing is performed allows obtaining a combined image having a less amount of local blurring, or deleting a portion not requiring character recognition from the focus positions allows reducing unnecessary image capturing. As a result, the user determination can optimize the focus positions and the number of times the image capturing is performed based on automatic determination according to the program.

As described above, according to the present embodiment, in a case where a combined image is obtained from a plurality of images obtained by capturing images of a target document from an oblique direction, it is possible to obtain a combined image having a sufficient image quality while minimizing the number of times the image capturing with change in focus position is performed.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s)

and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the present invention, in a case where a combined image is obtained from a plurality of images obtained by capturing images of a target document from an oblique direction, it is possible to obtain a combined image having a sufficient image quality while minimizing the number of times the image capturing with change in focus position is performed.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-251300, filed Dec. 26, 2016 which is hereby incorporated by reference wherein in its entirety.

What is claimed is:

1. An image processing apparatus comprising,
a camera that performs image capturing of a document; and
a processor that executes a program to perform:
extracting specified areas from one preliminary image that is obtained by the camera that performs preliminary image capturing of the document;
estimating a relative focal length in each of the specified areas based on a blur amount of each of the specified areas, wherein the relative focal length represents a change amount of focal length required for changing from an in-focus state in one specified area to an in-focus state in another specified area;
classifying the specified areas into a plurality of levels based on the relative focal length;
determining a focus position in each of the plurality of levels based on positions of the specified areas that are classified into the plurality of levels;
controlling the camera to obtain a plurality of images by performing primary image capturing of the document at the determined focus position in each level; and
generating a combined image by combining the obtained plurality of images.

2. The image processing apparatus according to claim 1, wherein the specified areas are classified into the plurality of levels such that, if any one of the specified areas is brought into focus among the plurality of specified areas belonging to the same level, blur amounts of the other specified areas belonging to the same level do not exceed a predetermined blur amount.

3. The image processing apparatus according to claim 2, wherein
the specified areas are extracted by grouping character pixel clusters as a set of pixels forming a character in the one preliminary image obtained by preliminary image capturing, and
the classification is performed based on an acceptable blur amount in character recognition processing applied to the combined image, the acceptable blur amount being the predetermined blur amount.

4. The image processing apparatus according to claim 3, wherein the grouping is performed based on a distance between the character pixel clusters.

5. The image processing apparatus according to claim 4, wherein the specified areas are extracted by dividing the grouped character pixel clusters into two or more based on a blur amount by character.

6. The image processing apparatus according to claim 3, wherein the classification is performed such that the specified areas separated by a distance not less than a certain distance are classified into different levels even in a case of satisfying a condition with respect to the predetermined blur amount.

7. The image processing apparatus according to claim 1, wherein a position of a barycenter based on all of the specified areas belonging to the same level is determined as a focus position in its level.

8. The image processing apparatus according to claim 1, wherein the estimation is performed by using an approximate expression or a conversion table representing a relation between the blur amount and the relative focal length.

9. The image processing apparatus according to claim 1, wherein the processor further performs:
displaying the determined focus position in each level; and
accepting change in the displayed focus position in each level.

10. The image processing apparatus according to claim 9, wherein the processor further performs displaying a guide showing arrangement of the document within an angle of view of the camera.

11. The image processing apparatus according to claim 1, wherein the processor further performs extracting, from each of the plurality of images obtained by performing primary image capturing of the document at the focus position in each level, an image corresponding to the specified area belonging to each level, and
wherein the combined image is generated by using the extracted image corresponding to the specified area.

12. The image processing apparatus according to claim 11, wherein the specified area is extracted by using a plurality of preliminary images obtained by preliminary image capturing, each being in focus at one of a plurality of focus positions based on the arrangement of the document shown by the guide.

13. The image processing apparatus according to claim 11, wherein the processor further performs:
storing, in a case of generating combined images for a plurality of documents, one preliminary image obtained by preliminary image capturing of one of the plurality of documents and from which extraction of the specified areas is completed; and
a second determining unit configured to compare a new preliminary image obtained by new preliminary image capturing of a new document with the stored preliminary image and determine whether a format of the new document is the same as a format of the stored document, wherein the first determining unit determines, in a case where the second determining unit determines that both of the formats are the same, a focus position in each level determined based on the stored image, as a focus position in each level for the primary image capturing of the new document.

14. A control method of an image processing apparatus, the control method comprising:

extracting specified areas from one preliminary image that is obtained by preliminary image capturing of a document;

estimating a relative focal length in each of the specified areas based on a blur amount of each of the specified areas, wherein the relative focal length represents a change amount of focal length required for changing from an in-focus state in one specified area to an in-focus state in another specified area;

classifying the specified areas into a plurality of levels based on the relative focal length;

determining a focus position in each of the plurality of levels based on positions of the specified areas that are classified into the plurality of levels;

obtaining a plurality of images by performing primary image capturing of the document at the determined focus position in each level; and generating a combined image by combining the obtained plurality of images.

15. A non-transitory computer readable storage medium storing a program for causing a computer to perform:

extracting specified areas from one preliminary image that is obtained by preliminary image capturing of a document;

estimating a relative focal length in each of the specified areas based on a blur amount of each of the specified areas, wherein the relative focal length represents a change amount of focal length required for changing from an in-focus state in one specified area to an in-focus state in another specified area;

classifying the specified areas into a plurality of levels based on the relative focal length;

determining a focus position in each of the plurality of levels based on positions of the specified areas that are classified into the plurality of levels;

obtaining a plurality of images by performing primary image capturing of the document at the determined focus position in each level; and generating a combined image by combining the obtained plurality of images.

* * * * *